(12) United States Patent
Kimura

(10) Patent No.: US 10,318,727 B2
(45) Date of Patent: Jun. 11, 2019

(54) MANAGEMENT DEVICE, MANAGEMENT METHOD, AND COMPUTER-READABLE RECORDING MEDIUM

(71) Applicant: FUJITSU LIMITED, Kawasaki-shi, Kanagawa (JP)

(72) Inventor: Kosaku Kimura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 230 days.

(21) Appl. No.: 15/407,041

(22) Filed: Jan. 16, 2017

(65) Prior Publication Data

US 2017/0262628 A1 Sep. 14, 2017

(30) Foreign Application Priority Data

Mar. 10, 2016 (JP) .................. 2016-047602

(51) Int. Cl.
*G06F 21/55* (2013.01)
*H04L 29/06* (2006.01)

(52) U.S. Cl.
CPC .......... *G06F 21/552* (2013.01); *G06F 21/554* (2013.01); *H04L 63/145* (2013.01); *H04L 63/08* (2013.01); *H04L 63/1425* (2013.01)

(58) Field of Classification Search
CPC .................................................. G06F 21/552
USPC ........................................................ 726/23
See application file for complete search history.

(56) References Cited

U.S. PATENT DOCUMENTS

| 2007/0096873 | A1* | 5/2007 | Sadr | G06K 7/0008 340/5.61 |
| 2009/0172794 | A1* | 7/2009 | McGuire | G06F 21/10 726/7 |
| 2011/0072506 | A1 | 3/2011 | Law et al. | |
| 2011/0320508 | A1 | 12/2011 | Naito et al. | |
| 2014/0282626 | A1 | 9/2014 | Muguda | |
| 2015/0222504 | A1* | 8/2015 | Srivastava | H04L 43/0823 709/224 |

FOREIGN PATENT DOCUMENTS

| JP | 2009-020812 | 1/2009 |
| JP | 2011-100443 | 5/2011 |
| WO | 2012001763 | 1/2012 |

\* cited by examiner

*Primary Examiner* — Jacob Lipman
(74) *Attorney, Agent, or Firm* — Fujitsu Patent Center

(57) ABSTRACT

A management device includes: a processor configured to: store, in a storage, request history information indicating a history of an Application Programming Interface (API) request transmitted by an application and an access-number management table representing number of times API access of the application is able to be made in each unit time; calculate, upon reception of the API request, as for an application having transmitted the API request, a stability based on transition of contents of the API request from the application and the request history information; change the number of times API access of the application is able to be made according to the stability; and upon reception of the API request from the application, compare number of times of access of the application and the number of times API access of the application is able to be made, and determine whether acceptance of the API request is made.

15 Claims, 16 Drawing Sheets

| USER | user_id |
|---|---|
| USER A | abc |
| USER B | def |
| USER C | efg |
| USER D | hij |
| USER E | klm |

| APPLICATION | API KEY |
|---|---|
| FIRST APPLICATION | 123 |
| SECOND APPLICATION | 456 |
| THIRD APPLICATION | 789 |

FIG.5

| URI | HTTP METHOD | | | |
|---|---|---|---|---|
| | GET | POST | PUT | DELETE |
| /attributes/{user_id} | ACQUIRE USER ATTRIBUTE | PROHIBIT | UPDATE USER ATTRIBUTE (ONLY USER HIMSELF CAN PERFORM UPDATE) | PROHIBIT |
| /data/{id} | ACQUIRE DATA | PROHIBIT | UPDATE DATA | DELETE DATA |
| /data | ACQUIRE DATA LIST | NEWLY ADD DATA | PROHIBIT | PROHIBIT |

| API KEY | USER ID | REQUEST URI | HTTP METHOD | PARAMETER | TIME |
|---|---|---|---|---|---|
| 123 | abc | /attributes/abc | GET | | 2015/06/08 09:00:00 |
| 123 | def | /attributes/def | GET | | 2015/06/08 09:01:00 |
| 123 | abc | /info/123 | GET | | 2015/06/08 09:02:00 |
| 123 | abc | /info | POST | CONTENTS OF NEW DATA | 2015/06/08 09:03:00 |

| APPLICATION | API KEY | state 1 | state 2 | TRANSITION PROBABILITY |
|---|---|---|---|---|
| FIRST APPLICATION | 123 | GET/attributes/{user_id} | GET/info/{id} | 0.6 |
| | 123 | GET/attributes/{user_id} | POST/info | 0.1 |
| | ... | ... | ... | ... |
| SECOND APPLICATION | 456 | ... | ... | ... |
| | 456 | ... | ... | ... |
| | ... | ... | ... | ... |
| THIRD APPLICATION | 789 | ... | ... | ... |
| | 789 | ... | ... | ... |
| | ... | ... | ... | ... |

| APPLICATION | NUMBER OF TIMES OF ACCESS | RATE LIMIT |
|---|---|---|
| FIRST APPLICATION | 100 | 300 |
| SECOND APPLICATION | 200 | 200 |
| THIRD APPLICATION | 40 | 50 |

FIG.11

| APPLICATION | API KEY | state 1 | state 2 | TRANSITION PROBABILITY |
|---|---|---|---|---|
| FIRST APPLICATION | 123 | GET/attributes/{user_id} | GET/info/{id} | 0.4 |
| | 123 | GET/attributes/{user_id} | POST/info | 0.1 |
| | ⋮ | ⋮ | ⋮ | ⋮ |
| | 123 | GET/attributes/{other_user_id} | GET/attributes/{user_id} | 0.1 |
| | 123 | GET/attributes/{other_user_id} | GET/attributes/{other_user_id} | 0.9 |
| | 123 | GET/attributes/{user_id} | GET/attributes/{other_user_id} | 0.1 |

INCLUDE NEW STATE ⇩ STABILITY 0

(a)

| APPLICATION | NUMBER OF TIMES OF ACCESS | RATE LIMIT |
|---|---|---|
| FIRST APPLICATION | 100 | 300 |
| SECOND APPLICATION | 200 | 200 |
| THIRD APPLICATION | 40 | 50 |

226

(b)

| APPLICATION | NUMBER OF TIMES OF ACCESS | RATE LIMIT |
|---|---|---|
| FIRST APPLICATION | 0 | 10 |
| SECOND APPLICATION | 0 | 200 |
| THIRD APPLICATION | 0 | 50 |

226a

MANAGEMENT DEVICE, MANAGEMENT METHOD, AND COMPUTER-READABLE RECORDING MEDIUM

CROSS-REFERENCE TO RELATED APPLICATION

This application is based upon and claims the benefit of priority of the prior Japanese Patent Application No. 2016-047602, filed on Mar. 10, 2016, the entire contents of which are incorporated herein by reference.

FIELD

The embodiments discussed herein are related to a management device, a computer-readable recording medium, and a management method.

BACKGROUND

An Application Programming Interface (API) is an interface that is provided to use certain data and functions from an external application system, and the API is created and disclosed by a data provider or a function developer. At present, it is a common procedure to disclose APIs in the form of a Web API that can be accessed by a HyperText Transfer Protocol (HTTP).

In recent years, in order to improve the convenience and safety of providing APIs, a type of product referred to as "API gateway" has been released. The API gateway is introduced to a backend server (an application server) that provides an API in the form of a reverse proxy to manage provision of the API. Users of APIs such as developers of external applications or systems use disclosed APIs via the API gateway, thereby developing new products and improving functions of existing products. It is considered to be important that, in the future, companies create new values by connecting their products, businesses, data, and the like to many companies and individuals. The API gateway has been attracting attention as a technique for promoting this object.

The API gateway has various functions for utilization of APIs (mainly Web APIs) by API users. Specifically, the API gateway provides an API key as an ID for authenticating and identifying an application to each application. With the API key, for each application, the API gateway manages URIs, parameters, and the like of APIs, controls an upper limit (a rate limit) of the number of accessible times in each unit time and access ranges for each API, and performs recording and analysis of statistical information on the number of calls and the like.

In recent years, as a rate-limit setting method of APIs, there has been proposed a control method for setting a rate limit according to the priority of applications and data. In the proposed control method, a priority is derived for each time period by using prediction algorithms while taking thresholds defined in advance into consideration. Conventionally, there has been proposed a method for detecting user's malicious operations according to the matching degree between an operation log and a legitimate log of a client PC.

Meanwhile, there has been a demand for business streamlining by API utilization in existing business systems using an API gateway. In the API utilization in existing business systems, there is a case where, depending on the original system design, API access with a unique procedure is provided to an application. In this case, depending on the access procedure of the corresponding API, there is a possibility that a system failure is caused.

Furthermore, there is a case where, after an API key is issued to an application, the application is updated so that the access procedure of the application is changed. This case is, for example a case where the updated application erroneously accesses an API with an unrecommended procedure because the updated application contains a bug due to the update.

Further, there is also a possibility that an API is used with the same API key by another application having a different access procedure. In other words, it is a case where the API key is used by an application with a malicious intent. In this case, with the application with a malicious intent, there is a risk of usage of data and functions that may cause damages on the corresponding API provider.

However, the related methods are systems for deriving the priority between applications and data in order to set a rate limit. Therefore, with these methods, it has been difficult to detect applications that may have been updated or used with a malicious intent and may cause damages on the system. Accordingly, with these related methods, because applications that may have been updated or used with a malicious intent can access APIs, there has been a problem that it is difficult to protect the data and functions provided with an API from the applications that may have been updated or used with a malicious intent. Although the technique described in Japanese Laid-open Patent Publication No. 2009-20812 can detect user's malicious operations, with this technique, it is difficult to detect applications that may have been updated or used with a malicious intent.

SUMMARY

According to an aspect of the embodiments, a management device includes: a processor configured to: store, in a storage, request history information indicating a history of an Application Programming Interface (API) request transmitted by an application and an access-number management table representing number of times API access of the application is able to be made in each unit time; calculate, upon reception of the API request, as for an application having transmitted the API request, a stability based on transition of contents of the API request from the application and the request history information; change the number of times API access of the application is able to be made according to the stability; and upon reception of the API request from the application, compare number of times of access of the application and the number of times API access of the application is able to be made, and determine whether acceptance of the API request is made.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 is a diagram illustrating an example of a data structure of an ID management table;

FIG. 4 is a diagram illustrating an example of a data structure of an API-key management table;

FIG. 5 is a diagram illustrating an example of a data structure of an API listing table;

FIG. 6 is a diagram illustrating an example of a data structure of a request-history management table;

FIG. 7 is a diagram illustrating an example of a data structure of a state transition table;

FIG. 8 is a diagram illustrating an example of a data structure of an access-number management table;

FIG. 11 is a diagram illustrating an example of a state transition instance;

DESCRIPTION OF EMBODIMENTS

Preferred embodiments will be explained with reference to accompanying drawings. The following embodiment is only an example of the present invention and the configurations of the invention are not limited to those described below.

Example of API Management System

Figure 1:
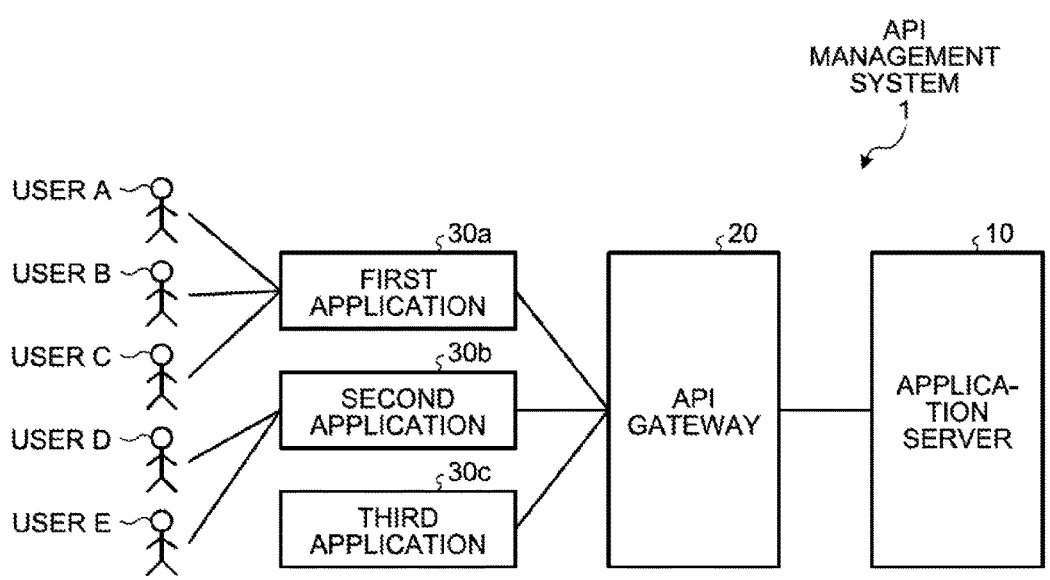
FIG. 1 is a diagram illustrating a configuration of an API management system according to an embodiment of the present invention.

As a management system according to an embodiment of the present invention, an API management system that manages provision of APIs is described as an example. FIG. 1 is a diagram illustrating a configuration of an API management system according to the present embodiment. As illustrated in FIG. 1, an API management system 1 includes an application server 10 that provides data or functions and an API gateway (management device) 20.

The application server 10 is a server device that provides data or functions created by a data provider or a function developer. While one application server is illustrated in the example of FIG. 1, the number thereof is not limited to one and the number can be set arbitrarily.

The API gateway 20 is a server device that is introduced on the application server 10 in the form of a reverse proxy. The API gateway 20 causes the data or functions provided by the application server 10 to be in the form of APIs, and manages provision of these APIs. The API gateway 20 is communicably connected to the application server 10 via a network. As a mode of the network, regardless of being wired or wireless, an arbitrary communication network such as the Internet, a LAN (Local Area Network), or a VPN (Virtual Private Network) can be mentioned.

The API gateway 20 is communicably connected to, via a network or the like, a plurality of applications (for example, a first application 30a to a third application 30c) that use an API. Therefore, the API gateway 20 is provided between applications using an API and the application server 10. The API gateway 20 issues an API key with which an application ID corresponds to respective applications, and performs authentication of the applications by using the API key.

Each of the applications is used by many users. For example, the first application 30a is used by users A to C, and the second application 30b is used by users D and E. The API gateway 20 also performs user authentication.

In this example, the API gateway 20 performs various types of processes by using an API key. Specifically, the API gateway 20 manages, by using an API key, a URI (Uniform Resource Locator), parameters, and the like of APIs for each of the applications. Further, the API gateway 20 controls, by using an API key, the upper limit of the number of accessible times and access ranges for each of APIs, and performs recording, analysis, and the like of statistical information such as the number of calls (API requests).

As for an application including an API request with a changed behavior as compared to previous behaviors, the API gateway 20 decreases the upper limit (rate limit) of the number of times API access can be made in each unit time. In other words, the API gateway 20 limits API access with respect to applications having a possibility that they have been modified into updated applications or malicious applications. Due to this configuration, the API gateway 20 protects APIs even when applications are modified into updated applications or malicious applications. In the following descriptions, configurations of the API gateway 20 are described.

Configurations of API Gateway

Figure 2:
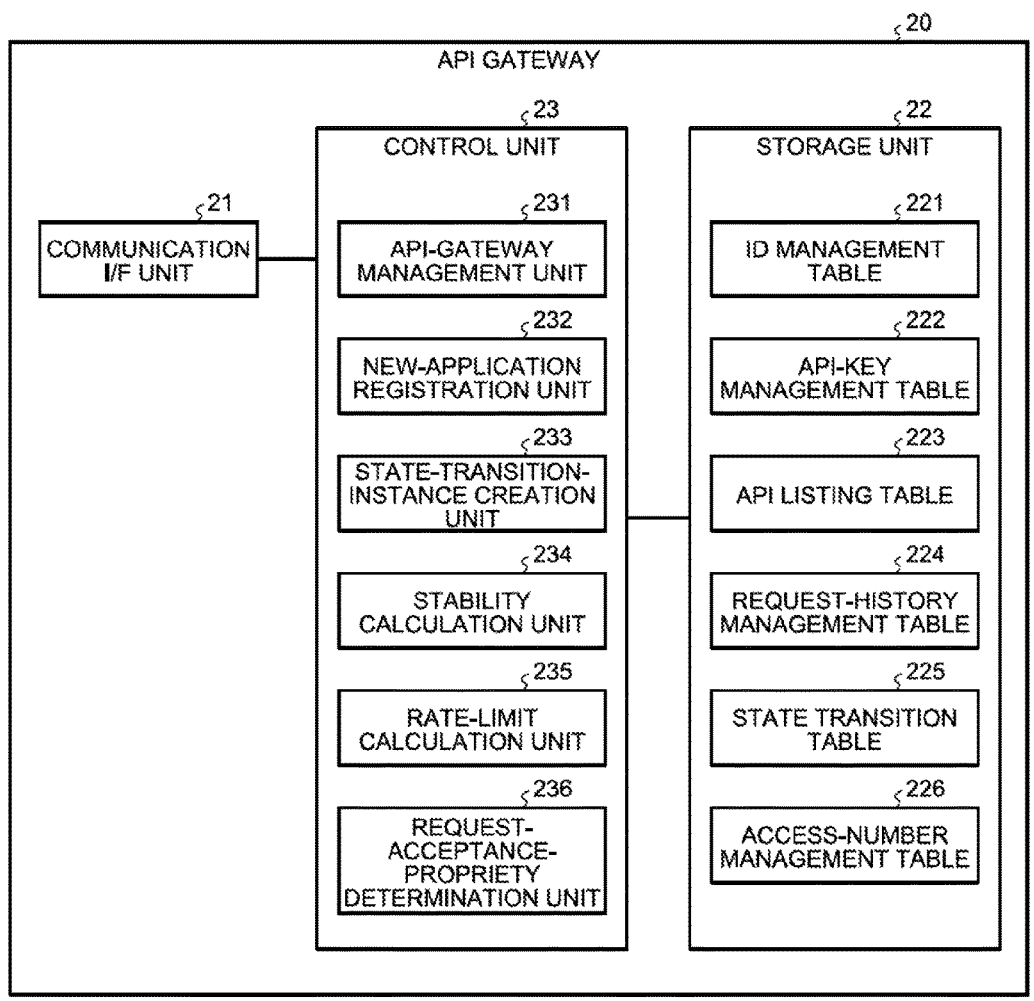
FIG. 2 is a block diagram illustrating a configuration of an API gateway.

FIG. 2 is a block diagram illustrating a configuration of the API gateway 20 illustrated in FIG. 1. As illustrated in FIG. 2, the API gateway 20 includes a communication interface (I/F) unit 21, a storage unit 22, and a control unit 23.

The communication I/F unit 21 is an interface for executing communication control between the API gateway 20 and other devices. The communication I/F unit 21 transmits and receives various types of information to and from other devices via a network. For example, the communication I/F unit 21 receives various types of information related to an API usage application and an API request from an application. Further, the communication I/F unit 21 receives various types of information related to data or functions of a providing target from the application server 10. As the communication I/F unit 21, a network interface card such as a LAN card can be employed.

The storage unit 22 is a storage device such as a semiconductor memory device such as a flash memory, a hard disk, or an optical disk. The storage unit 22 can be a data rewritable semiconductor memory such as a RAM (Random Access Memory), a flash memory, or an NVSRAM (Non Volatile Static Random Access Memory).

The storage unit 22 stores therein an OS (Operating System) executed by the control unit 23 and various types of programs for processing requests to be received. Further, the storage unit 22 stores therein various types of data to be used by programs executed by the control unit 23. For example, the storage unit 22 includes an ID management table 221, an API-key management table 222, an API listing table 223, a request-history management table 224, a state transition table 225, and an access-number management table 226.

The ID management table 221 is a table holding information in which each user and a user ID are corresponded to each other. FIG. 3 is a diagram illustrating an example of a data structure of the ID management table 221. As illustrated in FIG. 3, in the ID management table 221, user identification information and a user ID ("user_id") are corresponded to each other. For example, a user ID "abc" corresponds to a "user A". The API gateway 20 identifies the "user A" as the user ID "abc".

The API-key management table 222 is a table holding information in which each application and an API key are corresponded to each other. FIG. 4 is a diagram illustrating an example of a data structure of the API-key management table 222. As illustrated in FIG. 4, in the API-key management table 222, application identification information and an API key are corresponded to each other. In the example of FIG. 4, an API key "123" is allocated to a "first application".

The API listing table 223 is a table representing a list of APIs of the application server 10, where the APIs are provided to the applications by the API gateway 20. FIG. 5 is a diagram illustrating an example of a data structure of the API listing table 223. As illustrated in FIG. 5, in the API listing table 223, propriety of execution of HTTP methods, which are "GET", "POST", "PUT", and "DELETE" in the API gateway 20 is corresponded to each piece of information designated by a URI. The API gateway 20 manages provision of APIs to applications of which an API request has been received, according to the API listing table 223.

For example, upon reception of an API request of the "GET" method in which the URI has designated "/attributes/{user_id} (user attribute)", the API gateway 20 permits the application having transmitted the API request to acquire a user attribute. In the present embodiment, the initial state of the API provided by the API gateway 20 is designated as "GET/attributes/{user_id}".

A case where the API gateway 20 has received an API request with which a URI has designated "/attributes/{user_id}" is described. In this case, when the API request is of the "POST" method, the API gateway 20 prohibits the corresponding application from executing resource creation, and when the API request is of the "PUT" method, the API gateway 20 permits the corresponding application to update its user attribute. In the API gateway 20, only the user himself can perform update. Further, when the API request is of the "DELETE" method, the API gateway 20 prohibits deletion of resources.

The request-history management table 224 is a table representing, for each of applications, contents of API requests transmitted by the applications in time series. FIG. 6 is a diagram illustrating an example of a data structure of the request-history management table 224.

For example, as illustrated in FIG. 6, in the request-history management table 224, an API key, a user ID, a request URI of an API, an HTTP method with respect to the URI, a parameter, and an API request time of each application are corresponded to one another. The request-history management table 224 stores therein, for example in the first row in FIG. 6, a fact that an API request of the "GET" method in which the request URI has designated "/attributes/{abc}" has been received from an application including an API key "123" on "2015/06/87 09:00:00". Upon reception of the API request, a state-transition-instance creation unit 233 (described later) records the contents of the API request in the request-history management table 224.

The state transition table 225 is a state transition table created for each application, and is a table representing transition probabilities among respective states that have transitioned according to respective previous API requests made by applications.

FIG. 7 is a diagram illustrating an example of a data structure of the state transition table 225. As illustrated in FIG. 7, in the state transition table 225, identification information of an application, identification contents of an API key, a state before transition ("state1"), a state after transition according to an API request ("state2"), and a transition probability from the "state1" to the "state2" are corresponded to one another. The state transition table 225 stores therein, for example in the first row in FIG. 7, a fact that the first application 30a makes transition from a "GET/attributes/{user_id}" state to a "GET/info/{id}" state with a probability of "0.6". Update of the state transition table 225 is performed by a stability calculation unit 234 (described later) based on a state transition instance created by the state-transition-instance creation unit 233.

The access-number management table 226 is a table holding information in which, for each of applications, application access and a rate limit are corresponded to each other. FIG. 8 is a diagram illustrating an example of a data structure of the access-number management table 226. As illustrated in FIG. 8, in the access-number management table 226, identification information of an application, the number of times of access, and a rate limit are corresponded to one another.

For example, as illustrated in FIG. 8, the access-number management table 226 stores therein a fact that the number of times of access of the first application 30a is one hundred. Subsequently, the access-number management table 226 stores therein a fact that the rate limit of the first application 30a is three hundred.

An initial value of the rate limit is issued by a new-application registration unit 232 (described later) when an application is newly registered in the access-number management table 226. Thereafter, a rate-limit calculation unit 235 (described later) regularly updates the value of the rate limit. The number of times of access in the access-number management table 226 is incremented or reset by a request-acceptance-propriety determination unit 236 (described later). The unit time is one hour, and the initial value of the rate limit is, for example, 50 per hour. The minimum value of the rate limit is, for example, 10 per hour. The access-number management table 226 is, for example, updated in every hour and is, for example, updated at every o'clock.

Referring back to FIG. 2, the control unit 23 is a device that controls the API gateway 20. As the control unit 23, an electronic circuit such as a CPU (Central Processing Unit) or an MPU (Micro Processing Unit) and an integrated circuit such as an ASIC (Application Specific Integrated Circuit) or an FPGA (Field Programmable Gate Array) can be employed. The control unit 23 includes an internal memory for storing therein a program in which various types of process procedures are defined and control data, and various processes are performed with the program and control data. The control unit 23 functions as various types of processing units as various types of programs are operated.

The control unit 23 includes an API-gateway management unit 231, the new-application registration unit 232, the state-transition-instance creation unit 233, the stability calculation unit 234, the rate-limit calculation unit 235 (changing unit), and the request-acceptance-propriety determination unit 236 (determination unit).

The API-gateway management unit 231 transmits information and the like received from applications to the application server 10. Further, the API-gateway management unit 231 transmits information indicating results of processing performed by the application server 10 to applications. The API-gateway management unit 231 manages communication between applications and the application server 10. Upon reception of a usage application from a new application, the API-gateway management unit 231 issues an API key to the application. The API gateway 20 performs authentication of the application by using the API key.

Upon reception of a usage application from an application, the new-application registration unit 232 transmits the usage application to the API-gateway management unit 231, and returns an issued API key to the application. The new-application registration unit 232 registers the issued API key in the access-number management table 226, and sets a rate limit corresponding to the application of the API key to a predetermined initial value.

Upon reception of an API request from each application, the state-transition-instance creation unit 233 records the type of the API request, a parameter, time information, and the like in the request-history management table 224. The state-transition-instance creation unit 233 records an API key, a user ID, a request URI of an API, an HTTP method with respect to the URI, a parameter, and an API request time in the request-history management table 224.

The state-transition-instance creation unit 233 creates a state transition instance with respect to an application having transmitted an API request in order to calculate the behavior of the application having transmitted the API request. The state transition instance indicates transition probabilities among respective states that have transitioned according to an API request during a period from a log-in request to a log-out request or to time-out with respect to a certain user of a certain application. In this example, the log-in request is a first API request made by a certain user of a certain application. The log-out request is an API request of a type that has been specified by an API server in advance. A case where a predetermined time has elapsed since the latest request from a certain user has arrived is deemed as the time-out.

Upon reception of an API request, as for the application having transmitted the API request, the stability calculation unit 234 calculates a stability indicating how much the transition of contents of the API request from the application is stable with respect to the request-history management table 224. Specifically, as for the application having transmitted the API request, the stability calculation unit 234 calculates a stability by comparing a state transition instance created by the state-transition-instance creation unit 233 and the state transition table 225 in the storage unit 22. For example, as for the application having transmitted the API request, the stability calculation unit 234 increases and decreases the stability according to the matching degree between the state transition instance created by the state-transition-instance creation unit 233 and the state transition table 225.

The rate-limit calculation unit 235 changes, with respect to an application having transmitted an API request, a rate limit thereof according to the stability calculated by the stability calculation unit 234. For example, the rate-limit calculation unit 235 increases and decreases the rate limit according to increase and decrease of the stability calculated by the stability calculation unit 234. Specifically, the rate-limit calculation unit 235 increases the value of the rate limit when the value of the stability calculated by the stability calculation unit 234 increases. On the other hand, the rate-limit calculation unit 235 decreases the value of the rate limit when the value of the stability calculated by the stability calculation unit 234 decreases. Alternatively, the rate-limit calculation unit 235 increases the value of the rate limit when the value of the stability calculated by the stability calculation unit 234 has exceeded a predetermined threshold. On the other hand, the rate-limit calculation unit 235 decreases the value of the rate limit when the value of the stability calculated by the stability calculation unit 234 is equal to or less than a predetermined threshold. The rate-limit calculation unit 235 updates the rate limit of the access-number management table 226 in the storage unit 22 to a changed value in each predetermined time.

The request-acceptance-propriety determination unit 236 determines, upon reception of an API request from an application, whether reception of the API request with respect to the application is performed. Specifically, as for the application, the request-acceptance-propriety determination unit 236 compares the number of times of access in the access-number management table 226 and the rate limit in the access-number management table 226 to determine whether reception of the API request is performed. The request-acceptance-propriety determination unit 236 resets the number of times of access of each application in the access-number management table 226 in each predetermined unit time.

For example, when the number of times of access of the application having transmitted an API request reaches the rate limit of the application, the request-acceptance-propriety determination unit 236 transmits a message indicating denial of reception of the API request to the application. On the other hand, when the number of times of access of the application having transmitted an API request is less than the rate limit of the application, the request-acceptance-propriety determination unit 236 transmits a message indicating acceptance of reception of the API request to the application.

Specifically, when the contents of the access-number management table 226 are as those illustrated in FIG. 8, the number of times of access of the first application 30a is one hundred and the rate limit thereof is three hundred. Therefore, in the remaining time of a predetermined unit time, an API request can be transmitted for two hundred times. Accordingly, upon reception of an API request from the first application 30a, the request-acceptance-propriety determination unit 236 transmits a message indicating acceptance of reception of the API request to the first application 30a.

Meanwhile, the number of times of access of the second application 30b is two hundred and reaches the rate limit thereof, which is two hundred. Therefore, upon reception of an API request from the second application 30b, the request-acceptance-propriety determination unit 236 transmits a message indicating denial of reception of the API request to the second application 30b.

As described above, the API gateway 20 calculates an actual behavior of an application having transmitted an API request by using a state transition instance created by the state-transition-instance creation unit 233. In this connection, an example of behavior change in each state transition with respect to a certain application is described first.

State Transition of Application

Figure 9:
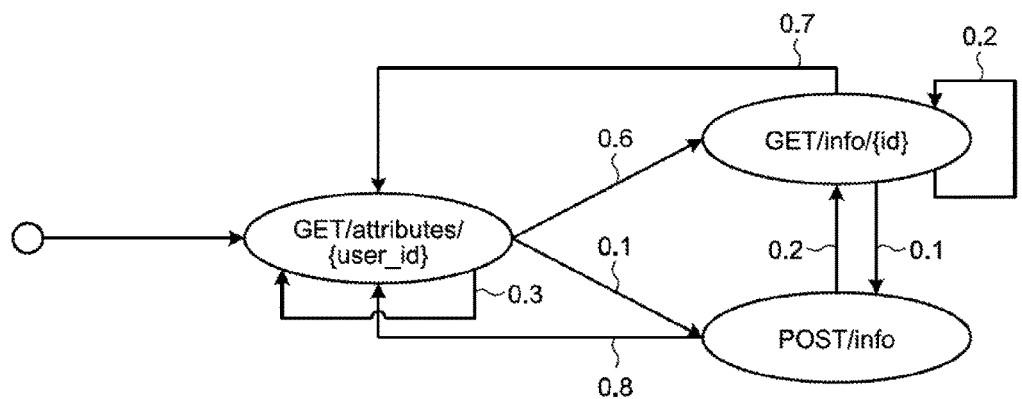
FIG. 9 is an explanatory diagram of an example of respective state transitions with respect to a first application.
Figure 10:
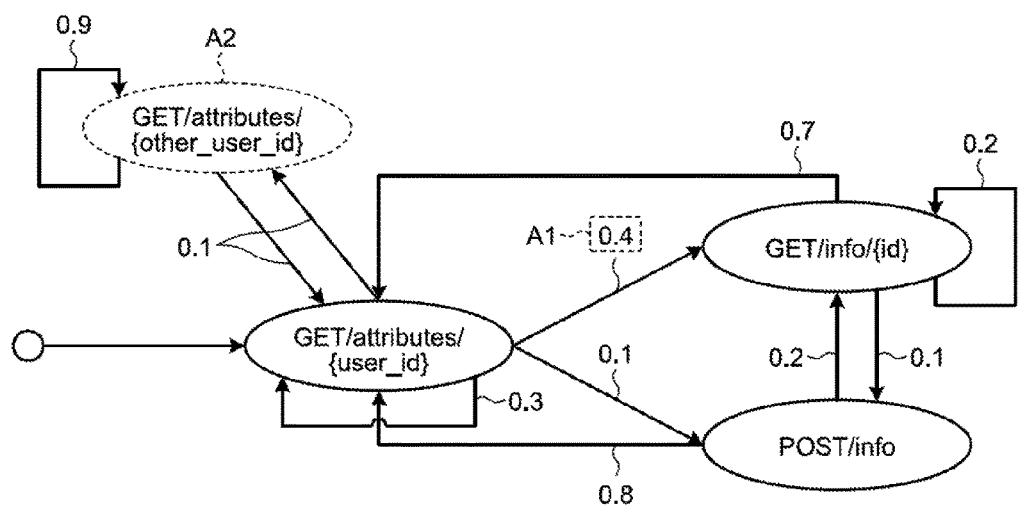
FIG. 10 is an explanatory diagram of an example of behavior change in respective state transitions with respect to the first application.

First, with reference to FIGS. 9 and 10, respective states having transitioned according to an API request from an application and transition probabilities among these states are described. FIG. 9 is an explanatory diagram of an example of respective state transitions with respect to a first application. FIG. 10 is an explanatory diagram of an example of behavior change in each state transition with respect to the first application.

For example, in the present embodiment, it is assumed that an initial state of an API provided by the API gateway 20 (a first API call: initial) is "GET/attributes/{user_id}", and log-out or time-out may occur in an arbitrary state.

As illustrated in FIG. 9, in the first application 30a, according to each of previous API requests, the states transition between the initial state and a "GET/info/{id}" state and between the initial state and a "POST/info" state. There is also a case where "state1" and "state2" are in the same state. Further, "transition probability from "state1" to "state2"" can be calculated by dividing "the number of times of transitions from "state1" to "state2"" by "the entire number of times of transitions from "state1"". With respect to an arbitrary state ("state1"), the sum of all the transition probabilities to the next state ("state2") becomes 1.

In the above descriptions, the transition probability from the "GET/attributes/{user_id}" state to the "GET/info/{id}" state according to the API request from the first application 30a is "0.6", and the transition probability of the opposite transition between these states is "0.7". Meanwhile, the transition probability from the "GET/attributes/{user_id}" state to the "POST/info" state is "0.1". Therefore, the first application 30a has had a behavior such that, as compared to the transition between the "GET/attributes/{user_id}" state and the "POST/info" state, the transition between the "GET/attributes/{user_id}" state and the "GET/info/{id}" state is performed more frequently.

On the other hand, when the first application 30a is updated or the API key of the first application 30a is taken over, the behavior of the first application 30a tends to change as compared to previous ones. For example, as illustrated in FIG. 10, the transition probability from the "GET/attributes/{user_id}" state as the initial state to the "GET/info/{id}" state is reduced to "0.4" (see A1 in FIG. 10). Further, a "GET/attributes/{other_user_id} state, which has not previously existed, is created (see A2 in FIG. 10). Furthermore, the transition probability from the "GET/attributes/{other_user_id}" state to another "GET/attributes/{other_user_id}" state is as high as "0.9", and the transition probability between the "GET/attributes/{other_user_id}" state and the "GET/attributes/{user_id}" state changes to "0.1".

As described above, when the application is updated or the API key of the application is taken over, the state that transitions according to the API request or the transition probability of states, that is, the behavior of the application, changes. Accordingly, in order to ascertain the presence of change of the behavior of the application, the state-transition-instance creation unit 233 creates a state transition instance indicating the behavior of the application having transmitted the API request. Processes performed by the state-transition-instance creation unit 233 are described next.

Processes of State-Transition-Instance Creation Unit

First, upon reception of an API request, the state-transition-instance creation unit 233 associates the contents of the API request, an API key of an application having transmitted the API request, a user ID, and a reception time with one another, and sequentially records these pieces of information in the request-history management table 224.

Thereafter, the state-transition-instance creation unit 233 reads all API request strings corresponding to relevant API keys having been accumulated in the request-history management table 224 at a predetermined timing. Specifically, as for an application of a certain API key, when there is reception of a log-out request or there is time-out of a certain user, the state-transition-instance creation unit 233 reads an API request string corresponding to the API key. Further, the state-transition-instance creation unit 233 reads API request strings corresponding to respective API keys during a period from a log-in request to a log-out request or to time-out.

Thereafter, the state-transition-instance creation unit 233 sorts all the read API request strings in a time-series order, and then acquires a combination between "state1" and "state2" and the transition probability from "state1" to "state2" with respect to applications corresponding to the API keys.

In this case, as for respective arguments of APIs, when the values thereof are different from one another, assuming the difference as different states or as the same state is decided in advance with control executed by the application server 10 and the like. That is, handling of the states is decided in advance for each attribute.

For example, "/data/{id}" is set be the same state regardless of the value of "id". Meanwhile, "/attributes/{user_id}" is classified with two states, that is, whether "user_id" is the user himself or another user. According to this rule, the state-transition-instance creation unit 233 determines each state of applications corresponding to the API keys. As described above, "transition probability from "state1" to "state2"" can be calculated by dividing "the number of times of transitions from "state1" to "state2"" by "the entire number of times of transitions from "state1"".

FIG. 11 is a diagram illustrating an example of a state transition instance. The state-transition-instance creation unit 233 creates a state transition instance 225a illustrated in FIG. 11 for the first application 30a with a behavior having changed to that illustrated in FIG. 10.

As illustrated in FIG. 11, the state transition instance 225a indicates that the transition probability from the "GET/attributes/{user_id}" state to the "GET/info/{id}" state is "0.4" (see A11 in FIG. 11). Further, the state transition instance 225a includes, as indicated by A12 of FIG. 11, a new state that is different from the state indicated in the state transition table 225. The new state is a "GET/attributes/{other_user_id}" state. As a new state transition, the state transition instance 225a includes transition among "GET/attributes/{user_id}" states and transition between the "GET/attributes/{other_user_id}" state and another "GET/attributes/{other_user_id}" state.

As described above, as the state-transition-instance creation unit 233 creates a state transition instance for an application having issued an API request, it becomes possible to compare the present behavior of the application and previous behaviors thereof indicated in the state transition table 225.

The stability calculation unit 234 calculates, by using the state transition instance 225a created by the state-transition-instance creation unit 233, the stability of the first application 30a, for example. A stability calculating process performed by the stability calculation unit 234 is described next.

Processes Performed by Stability Calculation Unit

The stability calculation unit 234 increases and decreases stabilities according to the matching degree between a state transition instance created by the state-transition-instance creation unit 233 and the state transition table 225 stored in the storage unit 22. The stability calculation unit 234 determines, by calculating the stabilities, an application including an API request with a changed behavior as compared to previous behaviors.

Specifically, when a state transition instance includes a state that is not indicated in the state transition table 225, the stability calculation unit 234 determines that an application corresponding to the state transition instance includes an API request with a greatly changed behavior as compared to previous behaviors. Therefore, in this case, the stability calculation unit 234 calculates the stability as the smallest value (for example, "0").

When the state transition instance includes a state transition that is not indicated in the state transition table 225, the stability calculation unit 234 determines that an application corresponding to the state transition instance includes an API request with a changed behavior as compared to previous behaviors. Therefore, in this case, the stability calculation unit 234 calculates the stability as a smaller value (for example, "1").

When the matching degree between the transition probability of the state transition instance and the transition probability of the state transition table 225 is less than a predetermined value, the stability calculation unit 234 determines that an application corresponding to the state transition instance has a behavior with small change from previous behaviors. Therefore, in this case, the stability calculation unit 234 calculates the stability as a larger value (for example, "2"). The stability calculation unit 234 uses, for example, an algorithm for calculating an editing length of character strings, to calculate the matching degree between the state transition instance and the state transition table 225.

When the matching degree between the transition probability of the state transition instance and the transition probability of the state transition table 225 is equal to or larger than a predetermine value, the stability calculation unit 234 determines that an application corresponding to the state transition instance has a behavior with the least change from previous behaviors. Therefore, in this case, the stability calculation unit 234 calculates the stability as the largest value (for example, "3").

For example, a case where, as for the first application 30a, a matching state between the state transition instance 225a illustrated in FIG. 11 and the state transition table 225 illustrated in FIG. 7 is determined is described. In this case, as illustrated in FIG. 11, as for the transition probability from the "GET/attributes/{user_id}" state to the "GET/info/{id}" state, while the state transition table 225 has a transition probability of "0.6", the state transition instance 225a has a reduced transition probability of "0.4" (see A11 in FIG. 11). Further, the state transition instance 225a newly includes, as compared to the state transition table 225, the "GET/attributes/{other_user_id}" state (see A12 in FIG. 11).

Therefore, the stability calculation unit 234 determines that the state transition instance 225a includes a state that is not indicated in the state transition table 225, and calculates the stability with respect to the state transition instance 225a as "0" (see an arrow A13 in FIG. 11).

By calculating the stability as described above, the stability calculation unit 234 numerically indicates as to how much the behavior of the application corresponding to the state transition instance has changed as compared to previous behaviors. Based on the calculated stability, it is possible to determine an application including an API request with a changed behavior as compared to previous behaviors.

For example, it is safe to say that an application with a lower stability is an application including an API request with a greatly changed behavior with respect to previous behaviors. In other words, the application with a lower stability has a high possibility that it is an updated application or an application modified into a malicious application. Further, it is safe to say that an application with a higher stability is an application including an API request with a behavior having small change with respect to previous behaviors. In other words, the application with a higher stability has a low possibility that it is an updated application or an application modified into a malicious application.

The stability calculation unit 234 outputs a calculated stability to the rate-limit calculation unit 235. In this connection, a rate-limit calculating process performed by the rate-limit calculation unit 235 is described next. As for the first application 30a, after a stability is calculated, the stability calculation unit 234 updates the state transition table 225 by using the contents of state transition indicated by the state transition instance 225a and transition probabilities among respective states.

Processes Performed by Rate-Limit Calculation Unit

The rate-limit calculation unit 235 increases and decreases, according to increase and decrease of the stability of an application output by the stability calculation unit 234, the rate limit of the application. The rate-limit calculation unit 235 then updates the value of the rate limit of the access-number management table 226 to a changed value.

Specifically, in a case where the stability has the smallest value, such as a case where the stability is "0", the rate-limit calculation unit 235 changes the rate limit of the application to the minimum value set in advance (for example, "10"). In a case where the stability is even lower, such as a case where the stability is "1", the rate-limit calculation unit 235 changes the rate limit of the application to a value obtained by subtracting a predetermined value (for example, "5") from a previously set value. In a case where the stability is higher, such as a case where the stability is "2", the rate-limit calculation unit 235 maintains the rate limit of the application to be the previously set value. In a case where the stability has the highest value, such as a case where the stability is "3", the rate-limit calculation unit 235 changes the rate limit to a value obtained by adding a predetermined value (for example, "5") to the previously set value. As for the rate limit, its upper limit or lower limit can be set in advance.

Figure 12:
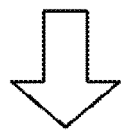
FIG. 12 is an explanatory diagram of update of the access-number management table.

FIG. 12 is an explanatory diagram of update of the access-number management table 226. As for the first application 30a in which the stability thereof is calculated as "0" by the stability calculation unit 234, the rate-limit calculation unit 235 updates an access-number management table 226a having a rate limit "300" (see (a) in FIG. 12) to an access-number management table 226a having a rate limit changed to "10" (see (b) in FIG. 12). When a unit time has elapsed, the request-acceptance-propriety determination unit 236 resets the number of times of access of all applications.

As a result, the API gateway 20 can limit the number of times of access of the first application 30a having a stability "0". Further, when the stability of the first application 30a is "1", by decreasing the rate limit from the previous number of times of access, the API gateway 20 can decrease the number of times of access. When the stability is "2", the API gateway 20 does not change the rate limit, and when the stability is "3", the rate limit is increased.

In this manner, because an application with a lower stability has a high possibility that it is an updated application or an application modified into a malicious application, the API gateway 20 decreases the rate limit of the application in each unit time. Due to this configuration, the API gateway 20 can protect data and functions provided with an API from an updated application or an application modified into a malicious application.

On the other hand, because an application with a high stability has a low possibility that it is an updated application or an application modified into a malicious application, the API gateway 20 maintains or increases the rate limit of the application in each unit time. Due to this configuration, as for an application with a low possibility that it is an updated application or an application modified into a malicious application, the API gateway 20 increases the convenience of API provision. An overall flow of an API management process performed by the API gateway 20 is described next.

Flow of API Management Process

Figure 13:
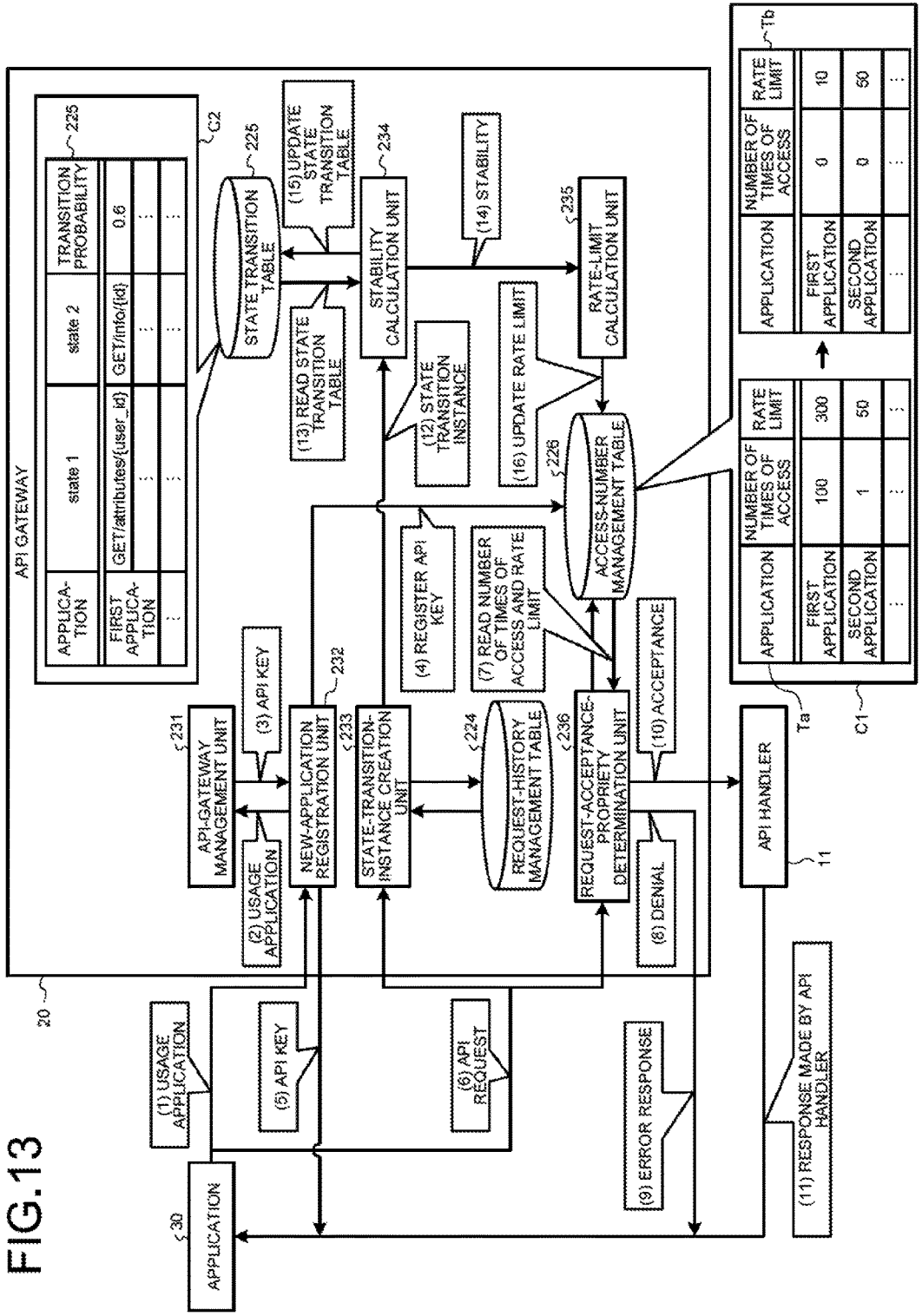
FIG. 13 is a diagram illustrating an example of an API management process according to the embodiment.

FIG. 13 is an explanatory diagram of an example of the API management process according to the present embodiment. First, in the API gateway 20, upon reception of a usage application (see (1) in FIG. 13) from an application 30, the new-application registration unit 232 transmits the usage application to the API-gateway management unit 231 (see (2) in FIG. 13).

Subsequently, the new-application registration unit 232 registers an issued API key (see (3) in FIG. 13) in the access-number management table 226 (see (4) in FIG. 13). At this time, as for an application (such as a second application) corresponding to the API key, the new-application registration unit 232 sets the rate limit thereof to an initial value (for example, "50") (see a left table "Ta" in a cell C1 in FIG. 13). Next, the new-application registration unit 232 returns the API key to the application 30 (see (5) in FIG. 13).

Subsequently, upon reception of an API request from the application 30 (see (6) in FIG. 13), the request-acceptance-propriety determination unit 236 reads the number of times of access and the rate limit of the application 30 from the access-number management table 226 (see (7) in FIG. 13).

When the number of times of access of the application 30 has reached the rate limit, the request-acceptance-propriety determination unit 236 denies the API request (see (8) in FIG. 13), and transmits an error response (see (9) in FIG. 13) to the application 30. Meanwhile, when the number of times of access of the application 30 is less than the rate limit, the request-acceptance-propriety determination unit 236 accepts the API request (see (10) in FIG. 13), and increases the number of times of access of the access-number management table 226. The request-acceptance-propriety determination unit 236 then transmits a response (see (11) in FIG. 13) made by an API handler 11 to the application 30.

Furthermore, the state-transition-instance creation unit 233 records the contents of the received API request in the request-history management table 224 in time series. The state-transition-instance creation unit 233 then creates a state transition instance at a predetermined timing and outputs the created state transition instance to the stability calculation unit 234 (see (12) in FIG. 13). The state transition instance indicates transition probabilities among respective states that have transitioned according to an API request during a period from a log-in request to a log-out request or to time-out with respect to the application 30. The state-transition-instance creation unit 233 reads a request history of the application 30 from the request-history management table 224 to create a state transition instance.

The stability calculation unit 234 reads a previous state transition as for an application having transmitted an API request from the state transition table 225 (see (13) in FIG. 13). As described above, the state transition table 225 represents respective states that have transitioned according to respective previous API requests from applications and transition probabilities among the states, with respect to each of the applications (see a cell C2 in FIG. 13).

The stability calculation unit 234 compares the read previous state transition and a state transition instance created by the state-transition-instance creation unit 233 to calculate a stability. The stability calculation unit 234 outputs the calculated stability to the rate-limit calculation unit 235 (see (14) in FIG. 13). Further, the stability calculation unit 234 updates the state transition table 225 based on the state transition instance created by the state-transition-instance creation unit 233 (see (15) in FIG. 13).

Subsequently, as for the application having its stability calculated, the rate-limit calculation unit 235 changes the rate limit according to the input stability, and the rate limit in the access-number management table 226 is updated to the changed value (see (16) in FIG. 13). For example, when the stability of the first application 30a is "0", the rate limit of the first application 30a is changed to the minimum value of "10" (see a right table "Tb" in the cell C1 in FIG. 13). As a result, in the API gateway 20, the number of times of access of the first application 30a with a stability of "0" can be limited to the minimum value.

As described above, the API gateway 20 creates a state transition instance for an application having transmitted an API request to calculate a stability indicating as to how much the state transition instance is stable with respect to the state transition table 225. The API gateway 20 determines, by using the calculated stability, an application including an API request with a changed behavior as compared to previous behaviors. Subsequently, as for the application including an API request with a changed behavior as compared to previous behaviors, the API gateway 20 decreases the rate limit in each unit time. Due to this configuration, the API gateway 20 can protect API data and functions from an updated application or an application modified into a malicious application.

Procedures of New-Application Registering Process

Figure 14:
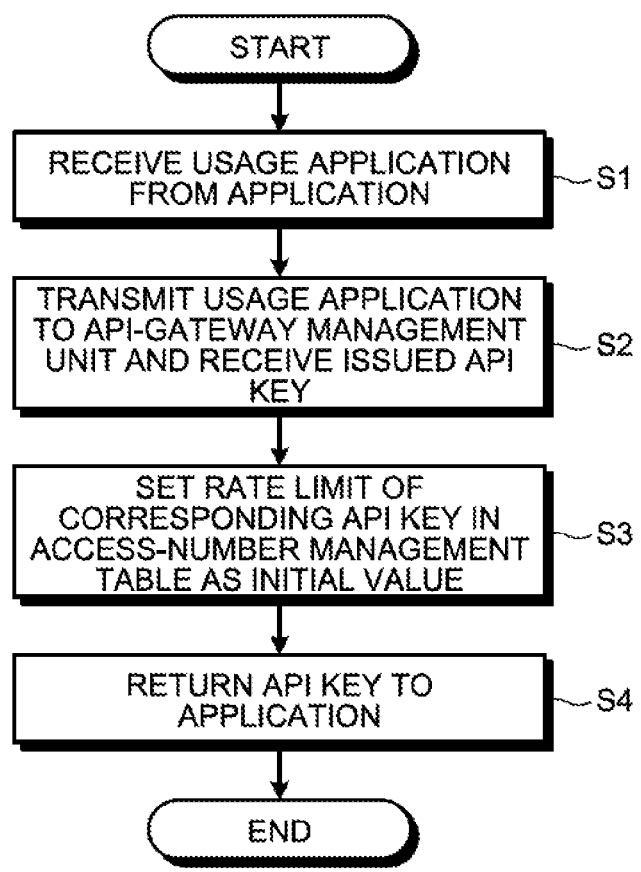
FIG. 14 is a flowchart for illustrating an example of procedures of a new-application registering process according to the embodiment.

Next, procedures of processes performed by respective functional constituent elements of the API gateway 20 are described in detail. First, procedures of a new-application registering process performed by the new-application registration unit 232 are described. FIG. 14 is a flowchart for illustrating an example of the procedures of the new-application registering process according to the present embodiment.

As illustrated in FIG. 14, when the new-application registration unit 232 receives a usage application from an application (Step S1), the new-application registration unit 232 transmits the usage application to the API-gateway management unit 231 and receives an issued API key (Step S2). The new-application registration unit 232 registers an application corresponding to the API key in the access-number management table 226, and sets a rate limit as an initial value (for example, "50") (Step S3). Subsequently, the new-application registration unit 232 returns the API key to the application (Step S4) to finish the new-application registering process.

Procedures of Request-Acceptance-Propriety Determining Process

Figure 15:
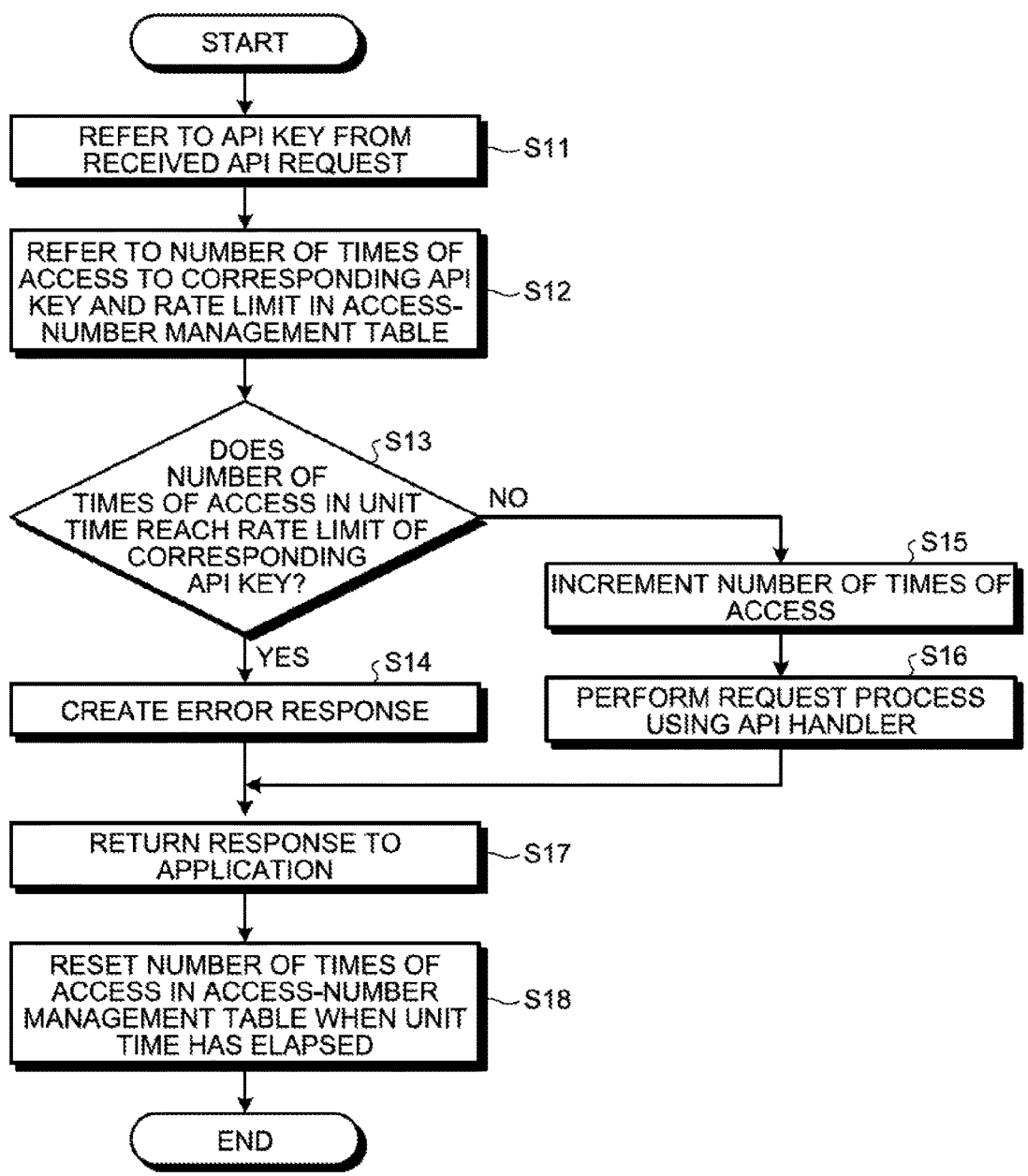
FIG. 15 is a flowchart for illustrating an example of procedures of a request-acceptance-propriety determining process according to the embodiment.

Next, procedures of a process of determining request acceptance propriety are described. FIG. 15 is a flowchart for illustrating an example of procedures of a request-acceptance-propriety determining process according to the present embodiment.

As illustrated in FIG. 15, upon reception of an API request from an application, the request-acceptance-propriety determination unit 236 refers to an API key from the received API request (Step S11). The request-acceptance-propriety determination unit 236 refers to the number of times of access and the rate limit of the API key in the access-number management table 226 (Step S12).

The request-acceptance-propriety determination unit 236 determines whether the number of times of access in a unit time has reached the rate limit of the API key based on the data referred to in the access-number management table 226 (Step S13).

When the request-acceptance-propriety determination unit 236 determines that the number of times of access in a unit time has reached the rate limit (YES at Step S13), the request-acceptance-propriety determination unit 236 creates an error response for denying the API request (Step S14).

On the other hand, when the request-acceptance-propriety determination unit 236 determines that the number of times of access in a unit time has not reached the rate limit (NO at Step S13), the request-acceptance-propriety determination unit 236 increments the number of times of access to the API key in the access-number management table 226 (Step S15). Subsequently, the request-acceptance-propriety determination unit 236 performs a request process using the API handler 11 (Step S16).

After finishing the processes at Step S14 or Step S16, the request-acceptance-propriety determination unit 236 returns a response to the application (Step S17). Subsequently, when a predetermined unit time has elapsed, the rate-limit calculation unit 235 resets the number of times of access in the access-number management table 226 (Step S18), and finishes the process of determining the request acceptance propriety.

Procedures of State-Transition-Instance Creating Process

Figure 16:
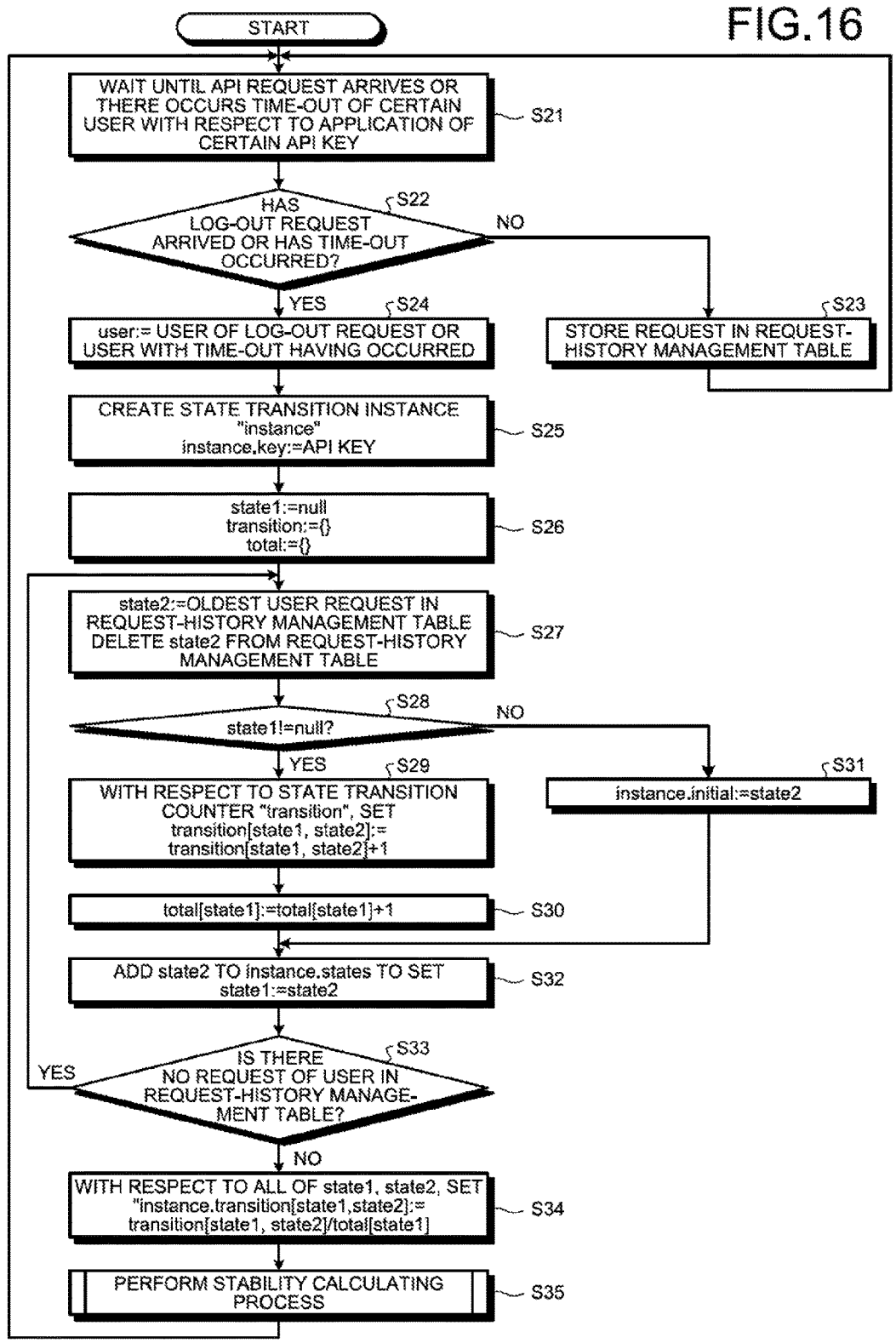
FIG. 16 is a flowchart for illustrating an example of procedures of a state-transition-instance creating process according to the embodiment.

Next, procedures of a process from creating a state transition instance to changing a rate limit are described. First, procedures of a process of creating a state transition instance are described. FIG. 16 is a flowchart for illustrating an example of procedures of a state-transition-instance creating process according to the present embodiment.

As illustrated in FIG. 16, as for an application of a certain API key, the state-transition-instance creation unit 233 waits until an API request arrives or there is time-out of a certain user (Step S21). The state-transition-instance creation unit 233 determines whether a log-out request has arrived or time-out has occurred (Step S22). When the state-transition-instance creation unit 233 determines that no log-out request has arrived and no time-out has occurred (NO at Step S22), the state-transition-instance creation unit 233 stores the contents of the current API request in the request-history management table 224 (Step S23). Thereafter, the process returns to Step S21 and continues to wait.

On the other hand, when the state-transition-instance creation unit 233 determines that a log-out request has arrived or time-out has occurred (YES at Step S22), "user:=user of log-out request or user with time-out having occurred" is set (Step S24). Next, the state-transition-instance creation unit 233 creates a state transition instance ("instance") for an application corresponding to the API key (Step S25). At this time, the state-transition-instance creation unit 233 sets "instance.key:=API key". Subsequently, the state-transition-instance creation unit 233 sets "state1:=null", "transition:={ }", and "total:={ }" (Step S26). Next, the state-transition-instance creation unit 233 advances to Step S27 and performs a process of sequentially extracting the entirety of the history of the application corresponding to the API key from the request-history management table 224.

First, the state-transition-instance creation unit 233 sets "state2:=oldest user request in request-history management table", and "state2" is deleted from the request-history management table 224 (Step S27). Next, the state-transition-instance creation unit 233 determines whether "state1!=null" is established (Step S28).

When the state-transition-instance creation unit 233 determines that "state1!=null" is established (YES at Step S28), with respect to a state transition counter "transition", "transition[state1,state2]:=transition[state1,state2]+1" is set (Step S29). The state-transition-instance creation unit 233 sets "total[state1]:=total[state1]+1" (Step S30), and advances to Step S32.

Meanwhile, when the state-transition-instance creation unit 233 determines that "state1!=null" is not established (NO at Step S28), "instance.initial:=state2" is set (Step S31), and the state-transition-instance creation unit 233 advances to Step S32.

Next, the state-transition-instance creation unit 233 adds "state2" to "instance.states" to set "state1:=state2" (Step S32). The state-transition-instance creation unit 233 determines whether there is no request of "user" in the request-history management table 224 (Step S33).

When the state-transition-instance creation unit 233 determines that there is a request of "user" in the request-history management table 224 (NO at Step S33), the process returns to Step S27. In this case, because the state-transition-instance creation unit 233 can determine that the history of the application corresponding to the API key remains in the request-history management table 224, the state-transition-instance creation unit 233 returns to Step S27 and continues extraction of the history of the application corresponding to the API key.

There is described a case where the state-transition-instance creation unit 233 determines that there is no request of "user" in the request-history management table 224 (YES at Step S33). In this case, the state-transition-instance creation unit 233 can determine that the entire pieces of history of the application corresponding to the API key has been extracted from the request-history management table 224. Therefore, the state-transition-instance creation unit 233 executes "instance.transition[state1,state2]:=transition[state1,state2]/total[state1]" for all of "state1, state2" (Step S34). In other words, with respect to combinations of state transitions of each of "state1, state2", the state-transition-instance creation unit 233 calculates respective transition probabilities. Subsequently, the state-transition-instance creation unit 233 outputs "instance.transition[state1,state2]" with respect to all of calculated "state1, state2" to the stability calculation unit 234. Specifically, the state-transition-instance creation unit 233 outputs the state transition instance 225a having the data structure illustrated in FIG. 11 to the stability calculation unit 234.

Next, the stability calculation unit 234 performs a stability calculating process of calculating a stability with respect to an "instance" created by the state-transition-instance creation unit 233 (Step S35). After finishing the process at Step S35, the state-transition-instance creation unit 233 returns to Step S21 and continues to wait.

Procedures of Stability Calculating Process

Figure 17:
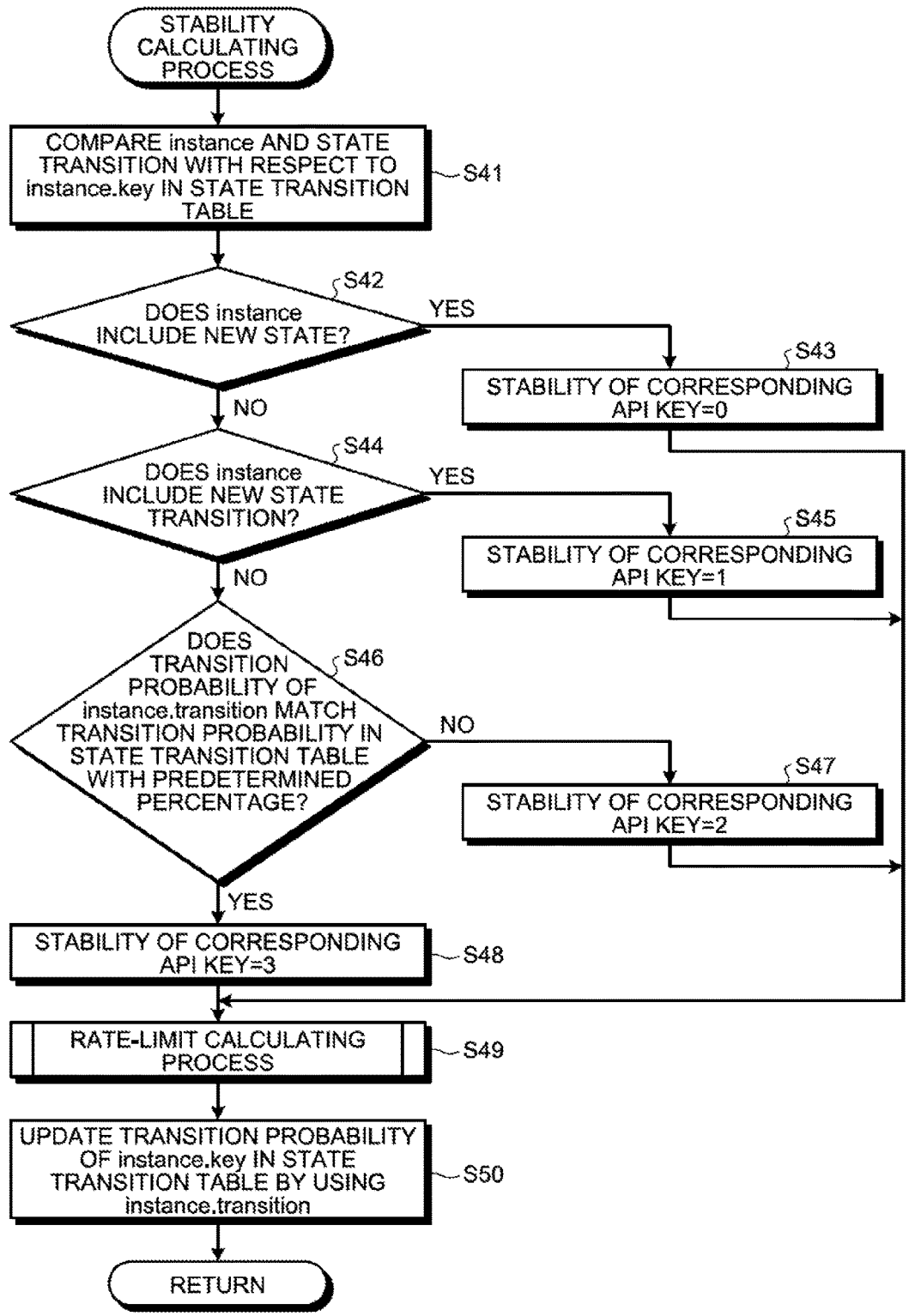
FIG. 17 is a flowchart for illustrating an example of procedures of a stability calculating process.

Next, procedures of the stability calculating process illustrated in FIG. 16 are described. FIG. 17 is a flowchart for illustrating an example of the procedures of the stability calculating process illustrated in FIG. 16.

As illustrated in FIG. 17, first, upon reception of "instance" from the state-transition-instance creation unit 233, the stability calculation unit 234 compares the "instance" and a state transition with respect to "instance.key" in the state transition table 225 (Step S41). In other words, the stability calculation unit 234 compares a transition state and transition probabilities among states indicated by the "instance" and a transition state and transition probabilities among states with respect to an application for which the "instance" is created in the state transition table 225.

Next, the stability calculation unit 234 determines whether the "instance" includes a new state (Step S42). In other words, the stability calculation unit 234 determines, as for this application, whether there is a request of a type that has not existed before.

When the stability calculation unit 234 determines that the "instance" includes a new state (YES at Step S42), the stability calculation unit 234 calculates the stability of the application corresponding to the API key as "0" (Step S43), and outputs the calculated value to the rate-limit calculation unit 235. In this case, it can be understood that the application corresponding to the API key has had a behavior of transitioning into a state that is completely different from previous ones.

On the other hand, when the stability calculation unit 234 determines that the "instance" does not include a new state (NO at Step S42), the stability calculation unit 234 determines whether the "instance" include a new state transition (Step S44). In other words, the stability calculation unit 234 determines, as for this application, whether there is a request reception order that has not existed before.

When the stability calculation unit 234 determines that the "instance" includes a new state transition (YES at Step S44), the stability calculation unit 234 calculates the stability of the application corresponding to the API key as "1" (Step S45), and outputs the calculated value to the rate-limit calculation unit 235. In this case, it can be understood that, while the application corresponding to the API key transitions between states that are same as previous ones, the application has had a behavior of transitioning in a different order.

On the other hand, when the stability calculation unit 234 determines that the "instance" does not include a new state transition (NO at Step S44), the stability calculation unit 234 determines whether the transition probability of "instance.transition" matches the transition probability in the state transition table 225 with a predetermined percentage (Step S46). The predetermined percentage is a value set in advance, and is "90%", for example. It is needless to mention that the predetermined percentage can be changed.

When the stability calculation unit 234 determines that the transition probability of the "instance.transition" does not match the transition probability in the state transition table 225 with a predetermined percentage (NO at Step S46), the stability calculation unit 234 calculates the stability of the application corresponding to the API key as 2 (Step S47). Subsequently, the stability calculation unit 234 outputs the calculated value to the rate-limit calculation unit 235. In this case, it is understood that, while the matching degree is low, the application corresponding to the API key has had a behavior same as previous ones.

On the other hand, when the stability calculation unit 234 determines that the transition probability of the "instance.transition" matches the transition probability in the state transition table 225 with a predetermined percentage (YES at Step S46), the stability calculation unit 234 calculates the stability of the application corresponding to the API key as "3" (Step S48). Subsequently, the stability calculation unit 234 outputs the calculated value to the rate-limit calculation unit 235. In this case, it is understood that the application corresponding to the API key has had a behavior with a high matching degree with respect to previous behaviors.

Thereafter, according to the stability calculated by the stability calculation unit 234, the rate-limit calculation unit 235 performs a rate-limit calculating process of calculating the rate limit of "instance.key" (Step S49). Next, the stability calculation unit 234 updates the transition probability of the "instance.key" in the state transition table 225 by using the "instance.transition" (Step S50) and finishes the stability calculating process.

Procedures of Rate-Limit Calculating Process

Figure 18:
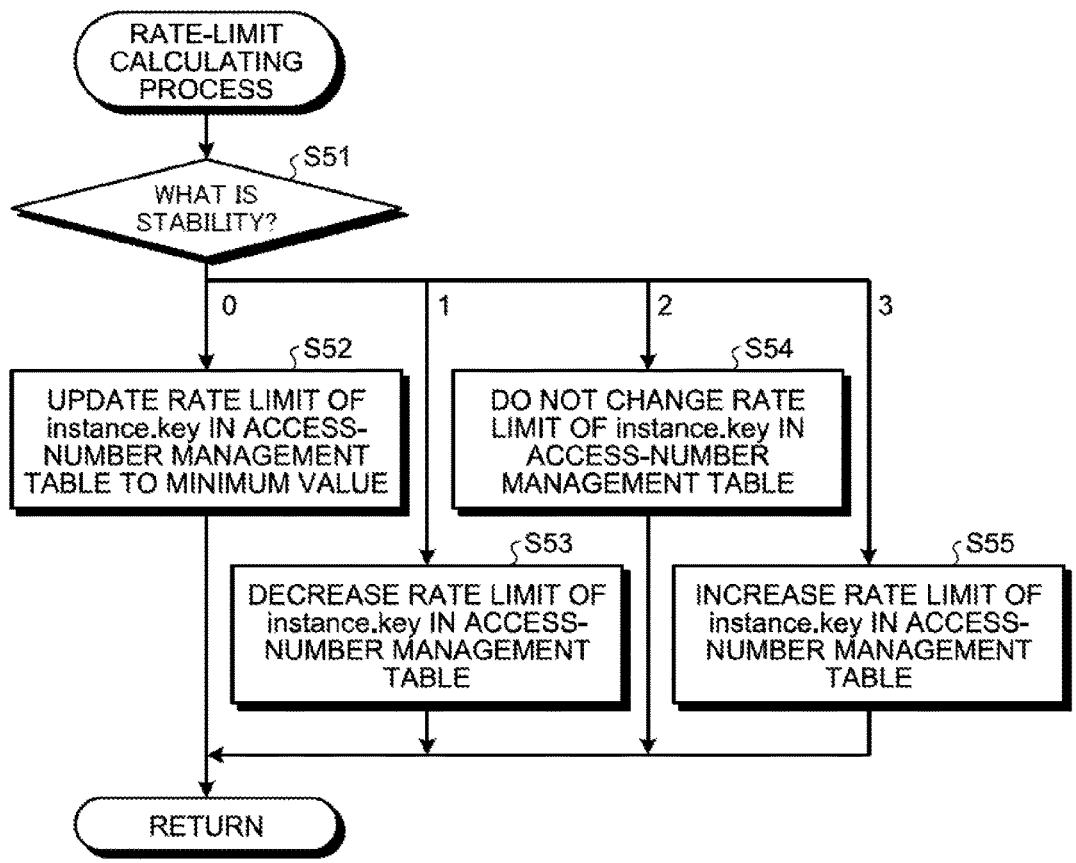
FIG. 18 is a flowchart for illustrating an example of procedures of a rate-limit calculating process.

Next, procedures of the rate-limit calculating process illustrated in FIG. 17 are described. FIG. 18 is a flowchart for illustrating an example of the procedures of the rate-limit calculating process illustrated in FIG. 17.

As illustrated in FIG. 18, the rate-limit calculation unit 235 determines whether the stability calculated by the stability calculation unit 234 is any one of 0, 1, 2, and 3 (Step S51).

When the rate-limit calculation unit 235 determines that the stability calculated by the stability calculation unit 234 is "0" (0 at Step S51), the rate-limit calculation unit 235 updates the rate limit of "instance.key" in the access-number management table 226 to the minimum value (for example, "10") (Step S52).

When the rate-limit calculation unit 235 determines that the stability calculated by the stability calculation unit 234 is "1" (1 at Step S51), the rate-limit calculation unit 235 decreases the rate limit of the "instance.key" in the access-number management table 226 (Step S53).

When the rate-limit calculation unit 235 determines that the stability calculated by the stability calculation unit 234 is "2" (2 at Step S51), the rate-limit calculation unit 235 does not change the rate limit of the "instance.key" in the access-number management table 226 (Step S54).

When the rate-limit calculation unit 235 determines that the stability calculated by the stability calculation unit 234 is "3" (3 at Step S51), the rate-limit calculation unit 235 increases the rate limit of the "instance.key" in the access-number management table 226 (Step S55).

Effect of Embodiment

As described above, the API gateway 20 according to the present embodiment creates a state transition instance with respect to an application having transmitted an API request, and calculates a stability that indicates how much the state transition instance is stable with respect to the state transition table 225. Due to this configuration, the API gateway 20 determines an application including an API request with a changed behavior as compared to previous behaviors. As for the application including an API request with a changed behavior as compared to previous behaviors, the API gateway 20 decreases the rate limit in each unit time. Due to this configuration, the API gateway 20 realizes access limit with respect to updated applications or applications modified into malicious applications. Therefore, according to the present embodiment, data and functions provided with an API can be protected from updated applications or applications modified into malicious applications.

Respective Constituent Elements of Respective Devices

Respective constituent elements in respective devices illustrated in the drawings are only functionally conceptual, and it is not always needed that the constituent elements are configured physically as illustrated in the drawings. That is, the specific state of distribution and integration of the respective devices is not limited to the illustrated ones, and all or a part of the constituent elements can be configured by being distributed or integrated functionally or physically in an arbitrary unit according to various types of loads or the status of use. For example, respective processing units of the control unit 23 of the API gateway 20 can be integrated to one another as appropriate. Further, processes performed by the respective processing units can be divided as processes performed by a plurality of processing units as appropriate. Furthermore, as for respective processing functions realized in the respective processing units, all or an arbitrary part thereof can be realized by a CPU (Central Processing Unit) and a program analyzed and executed by the CPU, or can be realized as hardware by a wired logic.

API Management System

Figure 19:
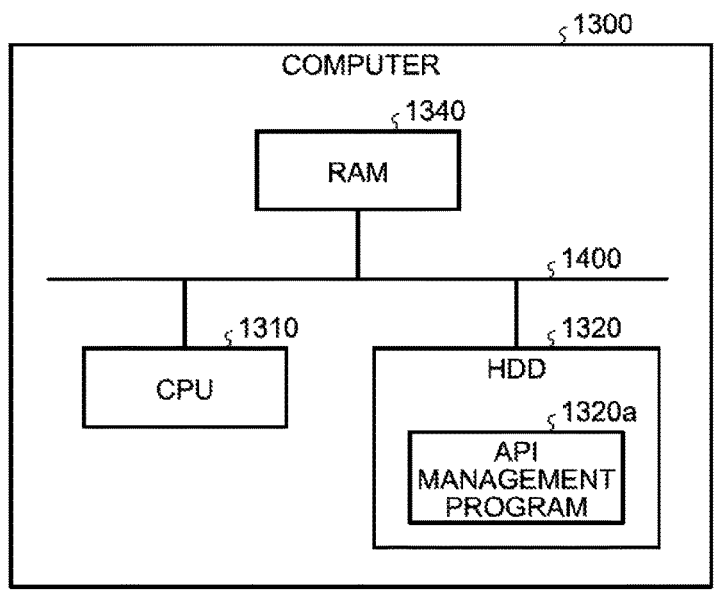
FIG. 19 is a diagram illustrating a computer that executes an API management program.

Various types of processes described in the above embodiment can be also realized by executing a program prepared in advance on a computer system such as a personal computer or a workstation. In the following descriptions, an example of a computer system that executes a program having functions identical to those described in the above embodiment is described. FIG. 19 is a diagram illustrating a computer that executes an API management program.

As illustrated in FIG. 19, a computer 1300 includes a CPU 1310, an HDD (Hard Disk Drive) 1320, and a RAM (Random Access Memory) 1340. The respective units 1310 to 1340 are connected via a bus 1400.

An API management program 1320a that demonstrates functions identical to those of the control unit 23 of the API gateway 20 described above is stored in advance in the HDD 1320. That is, the API management program 1320a includes a program that demonstrates functions identical to those of the API gateway 20. The API management program 1320a can be separated into plural programs as appropriate. Further, the API management program 1320a can also include a program that demonstrates functions identical to those of the communication I/F unit 21 and the storage unit 22 of the API gateway 20.

The HDD 1320 stores therein various types of information. For example, the HDD 1320 stores therein an OS and various types of data used for request distribution of range selection.

As the CPU 1310 reads the API management program 1320a from the HDD 1320 and executes the program, the CPU 1310 performs operations identical to those performed by respective processing units according to the above embodiment. That is, the API management program 1320a performs operations identical to those performed by the control unit 23 of the API gateway 20.

As for the API management program 1320a described above, it is not always needed to store the program in the HDD 1320 from the beginning.

For example, the program is stored in a "portable physical medium" such as a flexible disk (FD), a CD-ROM, a DVD disk, a magneto optical disk, or an IC card, that is inserted into the computer 1300. It is possible to configure that the computer 1300 reads the program from such a medium and executes the program.

Furthermore, the program is stored in "another computer (or a server)" or the like that is connected to the computer 1300 via a public line, the Internet, a LAN, a WAN, or the like. It is possible to configure that the computer 1300 reads the program from such a device and executes the program.

According to one aspect of the management device disclosed in the present application, the management device can protect data and functions provided with an API.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A management device comprising:
   a processor configured to:
   store, in a storage, request history information indicating a history of an Application Programming Interface (API) request transmitted by an application and an access-number management table representing number of times API access of the application is able to be made in each unit time;
   calculate, upon reception of the API request, as for an application having transmitted the API request, a stability based on transition of contents of the API request from the application and the request history information;
   change the number of times API access of the application is able to be made according to the stability;
   upon reception of the API request from the application, compare number of times of access of the application and the number of times API access of the application is able to be made, and determine whether acceptance of the API request is made; and
   decrease a rate limit of the application with a lower stability in each unit time.

2. The management device according to claim 1, wherein the processor is further configured to update, in each predetermined time, number of times of access of the application and the number of times API access of the application is able to be made.

3. The management device according to claim 1, wherein the processor is further configured to:
   as for an application having transmitted the API request, create a state transition instance indicating transition probabilities among states that have transitioned according to the API request, during a period from a log-in request to a log-out request or to time-out;
   store, in the storage, a state transition table representing transition probabilities among states created for each of the applications by using the request history information; and
   as for an application having transmitted the API request, compare the state transition instance and the state transition table to calculate the stability.

4. The management device according to claim 3, wherein the processor is further configured to:
   increase and decrease the stability according to a matching degree between the state transition instance and the state transition table; and
   increase and decrease the number of times API access is able to be made according to increase and decrease of the stability.

5. The management device according to claim 4, wherein the processor is further configured to:
   when the state transition instance includes a state that is not represented in the state transition table, calculate the stability as a smaller value, and when a matching degree between a transition probability of the state transition instance and a transition probability of the state transition table is less than a predetermined value, calculate the stability as a larger value; and as for the application, when the stability has a smaller value, change the number of times API access is able to be made to a value obtained by subtracting a predetermined value from a previously set value, and when the stability has a larger value, maintain the number of times API access is able to be made to be a previously set value, or change the number of times API access is able to be made to a value obtained by adding a predetermined value to a previously set value.

6. A non-transitory computer-readable recording medium storing a management program that causes a computer to execute a process comprising:
    calculating, upon reception of an API request, as for an application having transmitted the API request, a stability based on transition of contents of the API request from the application and request history information indicating a history of an API request having been transmitted by the application;
    changing number of times API access of the application is able to be made according to the stability;
    determining, upon reception of the API request from the application, whether acceptance of the API request is made according to number of times of access of the application and the number of times API access of the application is able to be made in each unit time; and
    decreasing a rate limit of the application with a lower stability in each unit time.

7. The non-transitory computer-readable recording medium according to claim 6, wherein the process further includes updating, in each predetermined time, number of times of access of the application and the number of times API access of the application is able to be made.

8. The non-transitory computer-readable recording medium according to claim 6, wherein the process further includes:
    as for an application having transmitted the API request, creating a state transition instance indicating transition probabilities among states that have transitioned according to the API request, during a period from a log-in request to a log-out request or to time-out;
    storing, in the storage, a state transition table representing transition probabilities among states created for each of the applications by using the request history information; and
    as for an application having transmitted the API request, comparing the state transition instance and the state transition table to calculate the stability.

9. The non-transitory computer-readable recording medium according to claim 8, wherein the process further includes:
    increasing and decreasing the stability according to a matching degree between the state transition instance and the state transition table; and
    increasing and decreasing the number of times API access is able to be made according to increase and decrease of the stability.

10. The non-transitory computer-readable recording medium according to claim 9, wherein the process further includes:
    when the state transition instance includes a state that is not represented in the state transition table, calculating the stability as a smaller value, and when a matching degree between a transition probability of the state transition instance and a transition probability of the state transition table is less than a predetermined value, calculating the stability as a larger value; and
    as for the application, when the stability has a smaller value, changing the number of times API access is able to be made to a value obtained by subtracting a predetermined value from a previously set value, and when the stability has a larger value, maintaining the number of times API access is able to be made to be a previously set value, or changing the number of times API access is able to be made to a value obtained by adding a predetermined value to a previously set value.

11. A management method comprising:
    calculating, upon reception of an API request, as for an application having transmitted the API request, a stability based on transition of contents of the API request from the application and request history information indicating a history of an API request having been transmitted by the application, by a processor,
    changing number of times API access of the application is able to be made according to the stability, by the processor,
    determining, upon reception of the API request from the application, whether acceptance of the API request is made according to number of times of access of the application and the number of times API access of the application is able to be made in each unit time, by the processor, and
    decreasing a rate limit of the application with a lower stability in each unit time.

12. The management method according to claim 11, further including updating, in each predetermined time, number of times of access of the application and the number of times API access of the application is able to be made.

13. The management method according to claim 11, further including:
    as for an application having transmitted the API request, creating a state transition instance indicating transition probabilities among states that have transitioned according to the API request, during a period from a log-in request to a log-out request or to time-out;
    storing, in the storage, a state transition table representing transition probabilities among states created for each of the applications by using the request history information; and
    as for an application having transmitted the API request, comparing the state transition instance and the state transition table to calculate the stability.

14. The management method according to claim 13, further including:
    increasing and decreasing the stability according to a matching degree between the state transition instance and the state transition table; and
    increasing and decreasing the number of times API access is able to be made according to increase and decrease of the stability.

15. The management method according to claim 14, further including:
    when the state transition instance includes a state that is not represented in the state transition table, calculating the stability as a smaller value, and when a matching degree between a transition probability of the state transition instance and a transition probability of the state transition table is less than a predetermined value, calculating the stability as a larger value; and
    as for the application, when the stability has a smaller value, changing the number of times API access is able to be made to a value obtained by subtracting a predetermined value from a previously set value, and when the stability has a larger value, maintaining the number of times API access is able to be made to be a previously set value, or changing the number of times API access is able to be made to a value obtained by adding a predetermined value to a previously set value.

* * * * *